United States Patent [19]

Mayo, Jr.

[11] 4,319,142

[45] Mar. 9, 1982

[54] POWER GENERATION UNIT FOR SPILLWAY GATE STRUCTURES

[75] Inventor: Howard A. Mayo, Jr., York, Pa.

[73] Assignee: Allis-Chalmers Corporation, Milwaukee, Wis.

[21] Appl. No.: 190,708

[22] Filed: Sep. 25, 1980

[51] Int. Cl.³ .................. E02B 9/02; F01D 15/10
[52] U.S. Cl. .................................. 290/52; 405/78
[58] Field of Search ................... 290/52; 405/78, 106

[56] References Cited

U.S. PATENT DOCUMENTS

| | | | |
|---|---|---|---|
| 914,399 | 3/1909 | Fancher | 405/78 |
| 2,360,961 | 10/1944 | Mayo | 405/106 |
| 3,184,218 | 5/1965 | Hochwalt et al. | 290/52 |
| 4,143,990 | 3/1979 | Atencio | 405/78 |

FOREIGN PATENT DOCUMENTS 269807  4/1927  United Kingdom ............... 405/106

*Primary Examiner*—J. V. Truhe
*Assistant Examiner*—Shelley Wade
*Attorney, Agent, or Firm*—Robert C. Jones

[57] ABSTRACT

A hydraulic turbine with water passageways and powerhouse for installation at a conventional spillway with gates includes a fabricated steel water passageway and cross beams which also serves as the lateral support between lifting devices which are operable to lift the installation to pass the upstream water discharge under flood conditions underneath the entire structure to reduce obstruction within the spillway.

11 Claims, 3 Drawing Figures

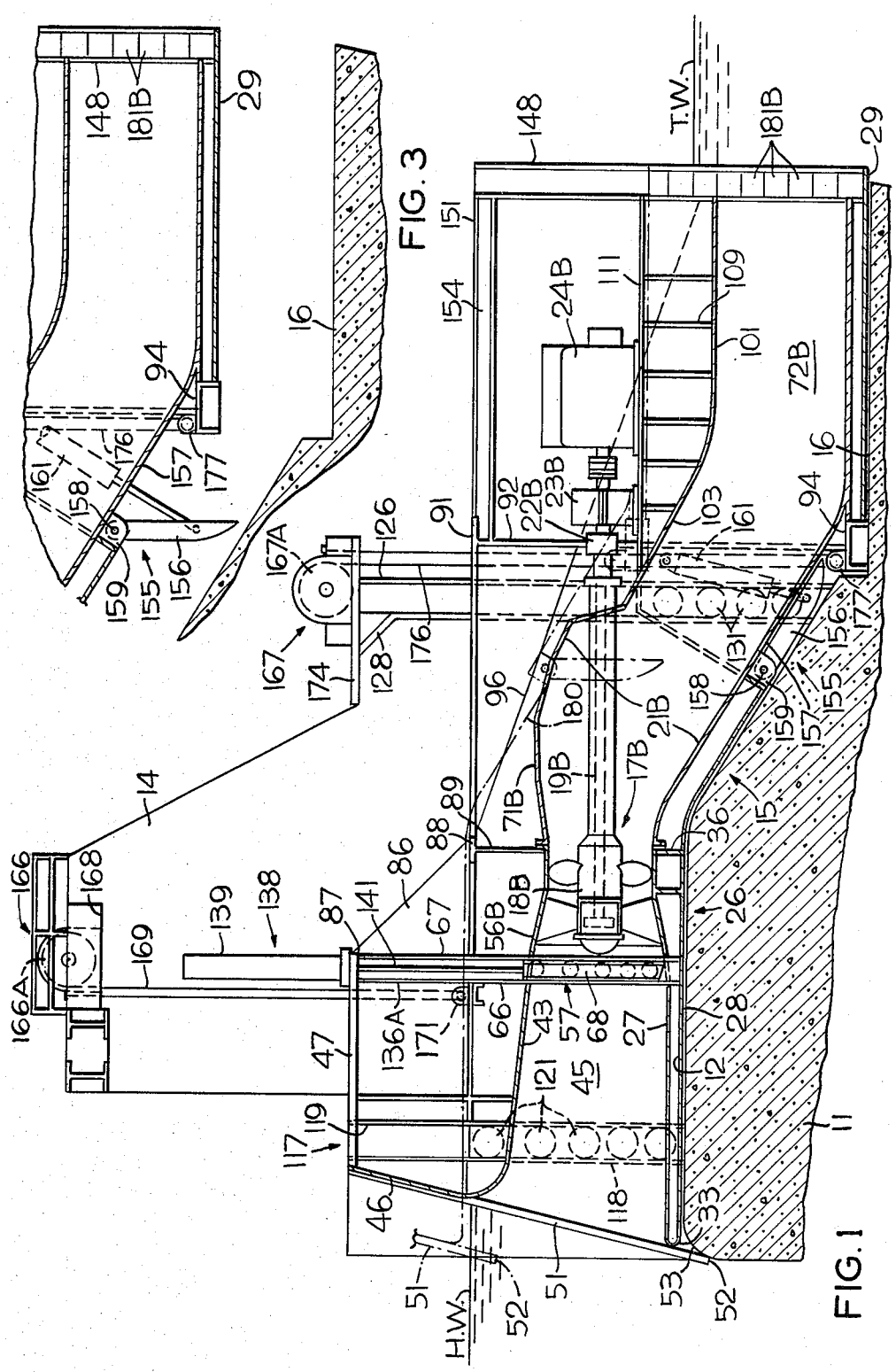

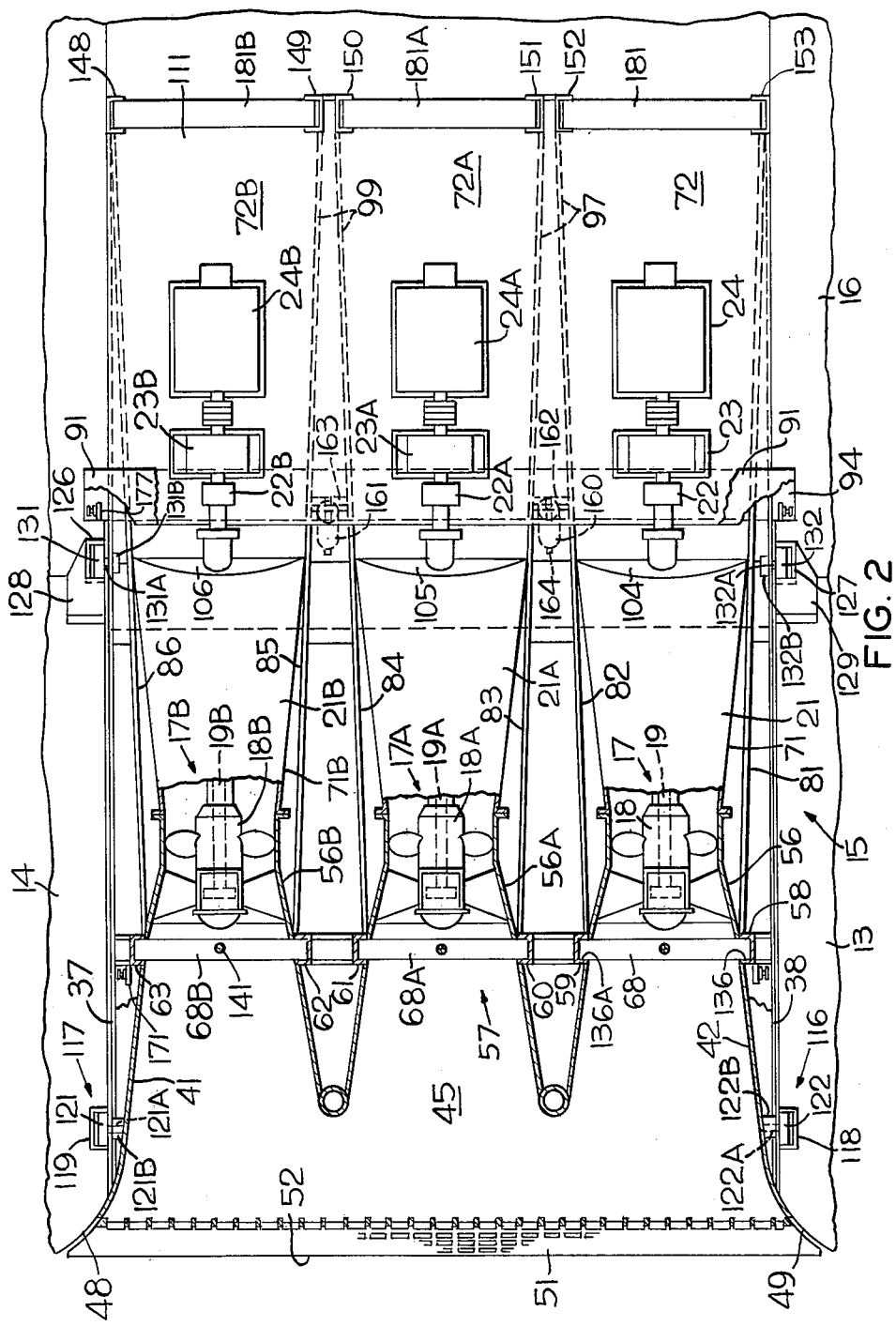

POWER GENERATION UNIT FOR SPILLWAY GATE STRUCTURES

BACKGROUND OF THE INVENTION

All over the United States, there are dams, dikes and navigation dams, utilized to control water flow, that are relatively low-head structures which can be used for power generation without excessive civil engineering construction. These structures in present day energy shortages can be made to produce energy at competitive rates to users. A major problem of the existing dam structures is that the spillways that are provided must be capable of handling flood water conditions. However, known power generation units require new powerhouse and foundation construction or major dam reconstruction to accommodate turbine installation. Under this approach, the existing sites will not be feasible because they usually exist where an increase in head is not possible and the reconstruction cost of the dam site cannot be economically justified.

SUMMARY OF THE INVENTION

The concept herein disclosed relates to a power generation unit which makes use of existing dam structures, particularly the upstream gate slot to take a part of the hydraulic load.

The power generating unit includes a fabricated steel frame structure presenting water passageways in which turbine units are disposed and also serves as the lateral support between lifting devices. Lifting devices such as hoists are operably connected to the frame structure to lift it bodily from the spillway passage to permit the unobstructed flow of flood water through the spillway and to remove the frame structure out of harms way to prevent damage to it by the flood water flow. It is contemplated that in returning the power generating unit fabricated frame structure to its operating position, the upstream or head water trash racks will be provided and arranged to overhang the lip of the spillway passage so that it will operate to screen out debris as the power generating unit is being returned to its operating position. The structural members of the power generating unit include double wall bottom and side members which also serve as a beam structure that serve to prevent buckling of the unit. Provision is made to provide for sealing means to protect the electrical components from the water passageways. The structure provides a standardized arrangement which provides for energy production with flood protection capabilities.

DESCRIPTION OF THE DRAWINGS

FIG. 1 is a view in elevation of a power unit installation with parts broken away to show interior details;

FIG. 2 is a plan view of the power installation of FIG. 1; and

FIG. 3 is an enlarged fragmentary view of the hydraulic uplift gate arrangement.

DESCRIPTION OF THE INVENTION

As shown in the drawings, there exists a dam 11 having at least one spillway opening 12 that is formed between vertical piers 13 and 14. The spillway 12 is adapted to receive one or more power generating units 15 and terminates in a horizontal extension forming an apron 16 which may extend downstream beyond the draft tube discharge. The water which normally flows over the spillway will flow through the power generating unit 15 herein disclosed as including three turbine/generator units 17, 17A and 17B. Each of the power generating units includes a vane supported bearing and a bladed turbine runner 18, 18A and 18B which are connected to associated drive shafts 19, 19A and 19B. Each shaft extends outwardly of the associated turbine draft tube 21, 21A and 21B and are coupled as at 22, 22A and 22B to an associated torque converter speed increaser 23, 23A and 23B. The outputs from the speed increasers are utilized to drive generators 24, 24A and 24B that are connected to an electrical load or grid (not shown). However, the output of the shafts 19, 19A and 19B could be coupled to drive other devices which require mechanical energy for their operation, such as air compressors, grinders and the like.

The power generator installation is a fabricated steel frame having a floor 26 comprising inner and outer spaced apart members 27 and 28. The lower frame member 28 is fabricated with a contour which closely matches the contour of the spillway 12 and extends over the surface of the apron 16. At the inlet or head water end, the lower floor member 28 is reverted and presents a smoothly contoured nose portion 33. The reverted lower floor portion forms the upper floor member 27 and extends downstream and substantially follows the contour of the lower floor member 28. At the location of the turbine runners 18, 18A and 18B, there is provided a transversely extended beam member 36 which is secured as by welding to the bottom floor member 28. The provision of beam 36 gives support to the turbines, reduces vibration effects and adds transverse stability to the unitized structure.

As best shown in FIG. 2, the floor members 27 and 28 extend to the sides or piers 13 and 14 of the spillway 12, the lower floor member 38 conforming to the existing vertical walls of the spillway piers 13 and 14 and identified by the reference numbers 37 and 38. Inner vertical water passageway walls diverge inwardly away from the wall members 37 and 38 and are identified by the reference numerals 41 and 42. A ceiling or top member 43 of steel plate is welded to the side members to thereby form a rectangular configured entrance or penstock 45.

To provide a smooth entryway into the penstock 45, the ceiling or roof member 43 is provided with a contoured steel upper forepiece 46 which extends upwardly a distance above the head water level and is welded to a horizontal longitudinally extending reinforcing member 47, shown in FIG. 1.

Secured to the contoured forepiece 46, as well as to the floor nose 33, is a trash rack 51 which is arranged to cover the inlet of the penstock 45 to prevent entry of relatively large debris. As shown in FIG. 1, the lower transverse edge 52 of the trash rack or screen extends down below the upstream bottom lip 53 of the spillway 12. The purpose of this arrangement will be set forth later in the description.

As previously mentioned, the installation includes three turbine runners 18, 18A and 18B each of which is supported within circular turbine intakes 56, 56A and 56B which communicate at their forward or upstream ends with openings formed in a transversely extending gate structure 57. The gate structure 57 includes transverse vertically extending beams 66 and 67 with spacer plates or channels 58, 59, 60, 61, 62 and 63 which provide guidance for vertically movable intake gates 68, 68A and 68B associated with the turbines 17, 17A and 17B, respectively. The circular turbine intakes 56, 56A and 56B at their downstream ends are joined as by flanging to circular turbine draft tubes 71, 71A and 71B which are elbowed and joined to a rectangular section draft tube extension, as exemplified by the tube extension 72 in FIG. 1 associated with the turbine unit 17 and tubes 72A and 72B as depicted in FIG. 2. Separation between the turbines and associated draft tubes is established by wall members 81, 82, 83, 84, 85 and 86. As shown in FIG. 1, the wall member 86 at its forward or upstream end, extends upwardly to present an upper edge 87 which is welded to the horizontal reinforcing member 47. The rearward or downstream extending edge or end 87 of plate 86 angles downwardly to meet a flange 88 of a horizontal transversely extending steel beam member 89. Plate 86 extends rearwardly and is welded to a vertical beam 92. The lower edge of the beam 92 is, in turn, welded to an inverted channel beam 94 which serves as an intermediate transversely extending footing or base. A similar arrangement is provided for the wall member 81. Thus, the wall members 81 and 86, the longitudinal beam 92, and plate 28, along with longitudinal beam 67 of the gate structure, form an open box around the turbine units which reinforces the turbine portion of the power generating unit 15.

The wall members 82, 83, 84 and 85 are welded to the floor plate member 28 and extend upwardly. The forward end of the wall members 82, 83, 84 and 85 terminate at a horizontal edge which is welded to the flange 88 of the beam 89 and thence slope rearwardly to conform to the slope of the extensions of the outer wall member 81 and 86, the extension 96 associated with the outer wall member 86 being shown in FIG. 1. The forward vertical edges of the wall members 82, 83, 84 and 85 are welded to the structural members of the gate guides 57. The outwardly diverging ends of the wall members 81 and 86 meet the outer wall members 37 and 38 and are welded to them. On the other hand, the inner wall members 82 and 83 converge to form double wall portions as at 97. Likewise, the wall members 84 and 85 are similarly configured and form a double wall portion as at 99.

The upper edges of the wall members 81 through 86 are all welded to a top plate 101, as shown in FIG. 1, which extends across the tail water draft tubes 72, 72A and 72B to form the ceiling thereof. A bent transitional piece, as exemplified by the piece 103 in FIG. 1, is provided to direct the flow of water from the elbow portions 104, 105 and 106 which connect to the rectangular section draft tube extensions 72, 72A, 72B of the individual turbine units.

Extending upwardly from the surface of the draft tube ceiling top plate 101 is a plurality of vertical reinforcing rib plates 109. The rib plates 109 are located between the double wall portions 81, 97, and 97, 99, and 99, 86 and serve as reinforcing floor supporting members for a steel floor 111 which is welded to both outer sidewall members 81 and 86 as well as to the vertical I-beam 92. As shown, the floor 111 serves to support the generator and speed increaser associated with each turbine unit.

As previously mentioned, the power generating unit is constructed so as to be capable of being elevated as a unit from the spillway 12 at times of floods. To this end, guide rollers are provided to assist in the vertical movement of the unit. As shown, there is provided forward guides 116 and 117. The guides are identical and include vertical channels 118 and 119 recessed in the vertical walls of the dam structure 11 which defines the spillway 12. The channels 118 and 119 extend upwardly to provide sufficient guiding and control of the power unit as it is elevated from the spillway. Provided on each side of the penstock 45 is a plurality of vertically arranged guide rollers 121 and 122. As shown in FIG. 2, the rollers are rotatably carried on the inwardly extending ends of stub shafts 121A and 122A which are carried in bearing blocks 121B and 122B welded in suitable openings formed in the steel walls 37 and 38. Thus, as the power unit is elevated, the penstock end thereof is guided and controlled by the rollers or wheels confined within the channels 118 and 119.

A similar arrangement is provided for the downstream end of the unit approximately at the mid-area thereof. As can be seen in FIG. 2, vertically arranged channel guides 126 and 127 are welded to supporting plates 128 and 129 which are secured to the vertical downstream faces of the side piers 14 and 13, respectively. The channels 126 and 127 extend upwardly to the horizontal plane in which the ends of the forward channels 118 and 119 are located. A plurality of guide rollers 131 and 132 are rotatably carried on outwardly extending ends of stub shafts 131A and 132A. The shafts 131A and 132A are supported in bearing blocks 131B and 132B, respectively, which are welded to the walls 37 and 38.

Guidance for the gates 68, 68A and 68B is provided by vertically arranged guides which are arranged on each side of the gates. The gate guides are similar and exemplified by the guides 136 and 136A associated with the gate 68. As depicted, the guides are supported on each side of the gate 68 to provide trackways to channels 62 and 63 as previously mentioned. As best shown in FIG. 1, these channels 62, 63 as well as the channels 61 and 60 and 59 and 58 associated with the gates 68A and 68B, all extend upwardly and terminate in the horizontal plane in which the other guide channels terminate. A top transverse plate 47 is provided with the gate channels being welded thereto. The ends of the plate 47 are welded to the side plates 37 and 38 so as to provide additional lateral stability to the unit. Each gate is movable vertically by an associated hydraulic servomotor as exemplified by the servomotor 138 associated with the gate 68. As shown, the servomotor cylinder 139 is attached to plate 47 and has its piston rod 141 extending through a suitable opening to connect with the gate 68. A similar servomotor arrangement is provided for the gates 68A and 68B.

The draft tube extension end of the power generator unit 15 is also provided with a plurality of pairs of vertical channels 148–149, 150–151, 152–153. The channels, as exemplified by channel 148 as depicted in FIG. 1, are welded at their lower ends to the steel bottom 29 of the draft tube extension. The intermediate portions of the channels are welded to the floor plate 111 and ceiling top plate 101 of the draft tube. At the upper end, the channels are secured to the channels or roof 151 of the generator room and horizontal beams, exemplified by the beam 154, with the opposite end of beam 154 being welded to the vertical beam 92. The channels 148–149, 150–151 and 152–153 are adapted to secure draft tube logs 181, 181A and 181B for blocking the water flow when it is necessary to perform work on the turbine. All of the vertical draft tube log receiving channels are secured as described for the channel 148.

To provide hydraulic uplift as an initial aid in the elevation of the power generation unit 15, there is provided a hydraulic uplift gate mechanism 155 under the elbow draft tubes of the turbine units. Such an arrangement is exemplified by the gate 156 depicted in FIG. 1. As shown, the gate 156 in open position or inoperative position is disposed within a recess or well 157 formed in the bottom of the frame towards the lower end of the draft tube. The gate 156 is pivotally movable from its closed or inoperative retracted position depicted in FIG. 1 to an extended or flow restricting position as depicted in FIG. 3. To this purpose, the gate is hinged on a shaft 158 which extends entirely across the unit. Support for the shaft 158 is provided by a plurality of support blocks, one of which is shown and identified by the numerals 159, which are welded to the frame. To move the gate to its open position as depicted in FIG. 3, there is provided servomotors 160 and 161 which are pivotally anchored to suitable hinges extending between the wall members 82-83 and 84-85 as indicated by the reference numerals 162 and 163. The servomotors 160 and 161 are directly connected to the gate leaf, with the piston rods, such as the rod 164 associated with the servomotor 160. The piston rods extend through suitable openings formed in the floor members of the frame. When it is desired to elevate the power generator unit, the gate 156 is lowered by operation of the servomotors. In the lowered or extended position the gate will serve as a throttle on the water flowing between the frame and the surface of the spillway to reduce the downpull effect of the full discharge flow.

To elevate the power generating unit 15 off of the spillway 12 and above the flood water elevation, there is provided four hoist mechanisms, two of which are shown in FIG. 1 and identified by reference numerals 166 and 167. The four hoists are deployed on each side of the spillway 12 and are supported on the piers 13 and 14 as exemplified by the hoists 166 and 167.

As shown, the hoist drum 166A is arranged to slightly overhang the spillway 12 and is supported in a platform level 168 formed in the pier 14. The hoist drive motor (not shown) which is connected to drive the drum 166A is also supported on the platform 168. A cable or chain 169 entrained over the hoist drum has its free end connected to suitable anchor block as at 171, that is, welded to transverse beam 66 between the walls 37 and 41 of the penstock. Similarly, the hoist 167 and its associated drive motor (not shown) is supported on a platform 174 with the chain drum arranged to slightly overhang the spillway 12. A chain or cable 176 entrained over the drum 167A has its free end secured to an anchor as at 177 that is attached to the plate 92. The pier 13 is likewise provided with hoist mechanisms complementary to the hoist 166 and 167 and are similarly arranged.

At flood water levels, the four hoist mechanisms are operated to lift the power generating unit 15 bodily from the spillway 12 to allow free flow of the flood water under the generating unit 15 and over the spillway into the tail race. As the hoists are operated in a lifting operation, the gate 156 is lowered to throttle the water flow providing an uplifting action on the unit thereby assisting in the initial separation of the power generating unit 15 from the spillway 12. As separation is effected between the power generator unit 15 and the spillway surface, water will flow under the unit and provide a lifting effect as an aid to the hoists. The power generation unit 15 is elevated to an elevation indicated by the dash and dot line 180. At this elevation the entire unit will be above flood water level and thus will not interfere with flood flow.

After flood water has declined, the hoists are operated to lower the power generating unit 15 back onto the spillway 12 where it can be returned to power generation. In the process of lowering the unit 15 to the spillway 12 the lower overhanging edge 52 of the trash rack 51 leads the structure back into the water. Thus, it will serve to screen debris as the opening between lower floor 28 and spillway 12 become smaller. To affect closure, seals are provided under gate structure 57 and on opposite sides.

The embodiments of the invention in which an exclusive property or privilege is claimed are defined as follows:

1. In a power generating unit for installation in a generating site having a spillway over which water flows, a fabricated frame for bodily placement on the spillway, a fabricated turbine unit carried within said frame and including a generator driven by said turbine unit;

intake closure structure movably supported by said frame to control the flow of water through said turbine unit; and elevating means operably connected to raise the fabricated frame from the spillway to allow free flow of flood waters over the spillway.

2. A power generator unit according to claim 1 wherein said turbine unit is enclosed in a draft tube fabricated from steel plates reinforced by stiffening ribs to minimize distortion and the effects of vibration.

3. A power generating unit according to claim 1 wherein said generator is carried by said fabricated frame externally of said draft tube; and a drive shaft operably connected to be driven by said turbine unit, said drive shaft extending outwardly through said draft tube and connected to said generator.

4. A power generating unit according to claims 1 or 2 wherein said intake closure structure includes hydraulic operators carried by the fabricated frame structure and operably connected to effect the desired control movement of said intake closure structure.

5. A power generating unit according to claim 1 wherein said fabricated frame includes at least one set of laterally extending spaced-apart guide means for the sides of said fabricated frame to facilitate the raising and lowering of said fabricated frame to and from the spillway in a controlled movement.

6. A power generating unit according to claim 1 wherein said elevating means includes at least one power operated hoists operably connected to said unit with respect to its operative position on the spillway.

7. In a power generating unit for installation in a generating site having a spillway over which water flows, a fabricated frame for bodily placement on the spillway, a fabricated turbine unit carried within said frame and including a generator driven by said turbine unit;

intake closure structure movably supported by said frame to control the flow of water through said turbine unit;

elevating means operably connected to raise the fabricate frame from the spillway to allow free flow of flood waters over the spillway;

a draft tube fabricated from steel plates reinforced by stiffening ribs to minimize distortion and the effects of vibrating, said draft tube being constructed and arranged to enclose the turbine unit;

hydraulic operators carried by the fabricated frame and operably connected to effect a desired control movement of said intake closure structure; and at least one set of laterally extending spaced-apart guide means for the sides of said fabricated frame to facilitate the raising and lowering of said fabricated frame unit to and from the spillway in a controlled movement.

8. A power generating unit according to claim 7 wherein said guide means are laterally extending rollers carried by said frame;

vertical channels associated with the spillway in position to receive associated guide rollers and cooperate therewith to control vertical bodily movement of said frame for substantially straight line movement.

9. A power generating unit according to claims 1 or 8 wherein there is provided a gate means under said draft tube, said gate means being located in a recess formed in the bottom of said frame;

actuating means operably connected to said gate means to pivot said gate means to a position below said floor as said generating unit is being elevated to thereby create an upwardly acting hydraulic force on said frame and turbine units by diverting the water that flows under said frame when it is lifted from its seat on the spillway against the bottom of said frame to thereby assist in the elevation of said frame and turbine units.

10. A power generating unit according to claims 1 or 7 wherein there is provided a trash rack secured to said power generating unit to screen the inlet from debris entering into said unit, said trash rack being constructed and arranged to overhang the entrance lip of the spillway when the power generating unit is in its operating position on the spillway, whereby the overhanging portion of the trash rack will lead the entire fabricated frame when it is being lowered onto the spillway and screen out debris to provide protection for the frame as it is being lowered to its operating position.

11. In a power generating unit for installation in a generating site having a spillway over which water flows, a fabricated frame for bodily placement on the spillway, a fabricated turbine unit carried within said frame and including a generator driven by said turbine unit;

intake closure structure movably supported by said frame to control the flow of water through said turbine unit;

at least one power operated hoist operably connected to raise the fabricated frame with respect to its operative position from the spillway to allow free flow of flood water over the spillway;

a draft tube fabricated from steel plates reinforced by stiffening ribs to minimize distortion and the effects of vibrating, said draft tube being constructed and arranged to enclose the turbine unit; and hydraulic operators carried by the fabricated frame and operably connected to effect a desired control movement of said intake closure structure.

* * * * *